UNITED STATES PATENT OFFICE

2,546,083

VULCANIZATION OF RUBBER

Bernard C. Barton, Clifton, N. J., assignor to United States Rubber Company, New York, N. Y., a corporation of New Jersey No Drawing. Application July 13, 1948, Serial No. 38,560

9 Claims. (Cl. 260—785)

This invention relates to improvements in the method of curing rubber, i. e. Hevea rubber and similar vulcanizable gums, and particularly to a method of making soft-vulcanized rubber which does not require the presence of zinc oxide or equivalent combined-metal activator of vulcanization.

More particularly, this invention relates to a method of vulcanizing rubber in the presence of a novel vulcanizing combination comprising (A) certain organic oxidizing materials, (B) a relatively small amount of sulfur, and (C) an accelerator of vulcanization comprising a metal dialkyl dithiocarbamate. The vulcanization proceeds in the absence of metal oxides or metal soaps or other combined metal activators such as metal carbonates. An organic amine increases the speed of cure and improves the physical properties of cured stock, but is not essential to my invention.

I am aware that vulcanization without zinc oxide was not uncommon to the rubber technologist before the advent of organic accelerators. Relatively large amounts of sulfur were necessary for desirable physical properties when zinc oxide was not used, and poor aging was an accepted characteristic of the vulcanizates.

With the development of modern accelerators the use of zinc oxide, together with lowered sulfur concentration, became the universal practice for making soft-vulcanized rubber and resulted in great improvements in the aging characteristics of the rubber products. However, certain disadvantages to the use of zinc oxide are known. For example, the stability of latices is greatly reduced by the presence of zinc oxide. Furthermore, the use of zinc oxide leads to prevulcanization and mill scorching of dry rubber compounds containing many of the commercial accelerators, such as metal dialkyl dithiocarbamates.

The principal object of the present invention is to provide new vulcanizable compositions which can be vulcanized without using zinc oxide or equivalent combined metal activators of vulcanization, which activators have heretofore been an essential ingredient in conventional low-sulfur vulcanizable compositions.

According to the present invention, it has been found that the necessity for employing zinc oxide or similar activators in low-sulfur formulations accelerated with a metal dialkyl dithiocarbamate can be eliminated by employing a vulcanizing combination comprising certain organic oxidizing material, viz., 2,2'-benzothiazyl disulfide, bis(4,5-dimethylthiazyl) disulfide, bis(ethoxyphenylimi-nomethyl) disulfide, p-quinone-bis-phenylimine, p-quinone dioxime, N-nitrosodiphenylamine, diazoaminobenzene, and m-dinitrobenzene, a small amount of sulfur, and a metal dialkyl dithiocarbamate accelerator, e. g., zinc dimethyl dithiocarbamate, cupric diethyl dithiocarbamate, lead dimethyl dithiocarbamate, etc. The alkyl group of the metal dialkyl dithiocarbamate may also be, e. g., propyl, butyl, amyl, octyl, etc. The accelerator brings about the combination of sulfur which is the initial step of the vulcanization reaction. A particularly good acceleration of the vulcanization process of my invention is obtained by using both a metal dialkyl dithiocarbamate and an organic amine.

Specific formulations for vulcanizing rubber in the absence of zinc oxide in the manner of this invention are shown in the table below. Portions of the stocks were heated for various times at 230° and 284° F. The extent of cure was indicated by tensile strength and stress at 200% elongation as shown in the table.

| Parts by Weight | Compound | | | | |
|---|---|---|---|---|---|
| | A | B | C | D | E |
| Rubber | 100 | 100 | 100 | 100 | 100 |
| Zinc dimethyl dithiocarbamate | 1.5 | 1.5 | 1.5 | 1.5 | 1.5 |
| Dibenzyl amine | 0.5 | 0.5 | 0.5 | 0.5 | 0.5 |
| Sulfur | 0.75 | | 0.75 | | 0.75 |
| N-nitrosodiphenylamine | | 5.0 | 5.0 | | |
| Benzothiazyl disulfide | | | | 5.0 | 5.0 |
| Tensile strength, p. s. i. | | | | | |
| Cured 2 hours at 230° F | 550 | 50 | 2,300 | 30 | 3,600 |
| Cured 4 hours at 230° F | 250 | 100 | 2,600 | 80 | 3,400 |
| Cured 8 hours at 230° F | 300 | 20 | 3,500 | 40 | 3,300 |
| Cured 15' at 284° F | 950 | 50 | 1,500 | 50 | 3,300 |
| Cured 30' at 284° F | 850 | 75 | 1,800 | 20 | 3,100 |
| Cured 60' at 284° F | 950 | 20 | 2,900 | 40 | 2,400 |
| Stress at 200% Elongation, p. s. i. | | | | | |
| Cured 2 hours at 230° F | 50 | 10 | 90 | 10 | 180 |
| Cured 4 hours at 230° F | 50 | 10 | 130 | 10 | 180 |
| Cured 8 hours at 230° F | 40 | 10 | 180 | 10 | 170 |
| Cured 15' at 284° F | 60 | 10 | 110 | 10 | 180 |
| Cured 30' at 284° F | 60 | 10 | 140 | 10 | 170 |
| Cured 60' at 284° F | 45 | 10 | 160 | 10 | 160 |

Examples C and E illustrate the improved vulcanization process of my invention. In Example A, in which the oxidizing agent was omitted, very little cure took place, and in Examples B and D, in which the sulfur was omitted, there was virtually no cure. It is evident from the data that the sulfur and the dithiocarbamate accelerator in combination with the oxidizing agents, viz., N-nitrosodiphenylamine in Example C and benzothiazyl disulfide in Example E, display highly effective vulcanizing action. This unexpected effect is all the more remarkable when it is considered that N-nitrosodiphenylamine has heretofore been well known as a retarder of vulcanization in conventional compounds containing zinc oxide. This vulcanization process has the important practical advantage that the mixture, being free from zinc activator, can be milled, calendered, extruded etc. without fear of scorching, and they can still be vulcanized by heat to soft rubber products of excellent properties.

The following examples show the advantage of using a combination of a metal dithiocarbamate accelerator and an amine when vulcanizing with an organic oxidizing agent:

| Parts by weight: | Compound F | G | H |
|---|---|---|---|
| Pale crepe | 100 | 100 | 100 |
| Benzothiazyl disulfide | 10 | 10 | 10 |
| Sulfur | 1 | 1 | 1 |
| Zinc dimethyl dithiocarbamate | | 2 | 2 |
| Dibenzyl amine | | | 1.0 |
| Stress at 200% Elongation, p. s. i.: | | | |
| Cured 8 hours at 100° C. | 40 | 210 | 310 |
| Cured 16 hours at 100° C. | 60 | 235 | 300 |

Examples H and J illustrate my invention. In Example F, wherein the metal dialkyl dithiocarbamate was omitted, very little cure took place. Although a good cure was obtained in Example G without the amine, it is seen that a superior accelerating effect is obtained when both zinc dimethyl dithiocarbamate and dibenzyl amine are used together as in Example H.

The following series of examples further demonstrate the effect of the metal dialkyl dithiocarbamate in my new vulcanization process.

| Parts by weight: | Compound J | K | L |
|---|---|---|---|
| Rubber | 100 | 100 | 100 |
| Sulfur | 1 | 1 | 1 |
| p-Quinone dioxime | 4 | 4 | |
| Zinc dimethyl dithiocarbamate | | 1.5 | 1.5 |
| Tensile Strength, p. s. i.: | | | |
| Cured 2 hours at 230° F. | 75 | 1900 | 150 |
| Cured 4 hours at 230° F. | 150 | 2200 | 200 |
| Cured 8 hours at 230° F. | 260 | 3200 | 240 |
| Cured 15' at 284° F. | 400 | 2100 | 300 |
| Cured 30' at 284° F. | 1100 | 2500 | 250 |
| Cured 60' at 284° F. | 1500 | 3000 | 200 |
| Stress at 200% Elongation, p. s. i.: | | | |
| Cured 2 hours at 230° F. | 40 | 155 | 75 |
| Cured 4 hours at 230° F. | 40 | 150 | 75 |
| Cured 8 hours at 230° F. | 40 | 145 | 60 |
| Cured 15' at 284° F. | 60 | 145 | 75 |
| Cured 30' at 284° F. | 60 | 150 | 65 |
| Cured 60' at 284° F. | 90 | 150 | 55 |

It is evident from the foregoing examples that the oxidizing agent alone, viz., p-quinone dioxime, as in Example J, is not effective in my vulcanization process; neither is the metal dialkyl dithiocarbamate alone, as in Example L, effective. However, the two materials in combination are seen to have excellent vulcanizing action in Example K, which illustrates the excellent physical properties of the soft-vulcanized product of my invention. It should be noted that the amount of sulfur employed in these experiments is relatively small, compared to the amount which would be used in conventional formulations for an equivalent cure.

When vulcanizates prepared according to my invention, as in Examples C, E, G, H and K above, are subjected to accelerated aging tests in the Geer oven for a period of four weeks it is observed that the tensile strength of my vulcanizate undergoes little change, while the tensile strength of conventional stocks prepared with zinc oxide decreases 55 to 60%.

The quantity of organic oxidizing material employed as vulcanizing agent in my invention may vary from about 2 to 15 parts per 100 parts of rubber, although it is preferred to employ about 3 to 5 parts. In general, the higher the molecular weight of the oxidizing material, the larger the amount employed. The higher the quantity of sulfur employed, the smaller the amount of oxidizing material required for an equivalent cure to a soft-vulcanized product.

The amount of sulfur which I employ is quite small, i. e., from 0.25 to only 2 parts per 100 parts of rubber. Conventional zinc oxide activated formulations require larger amounts of sulfur, e. g., 1 to 5 parts for an equivalent cure. While it is not desired to limit the invention to any particular theory of operation, I believe that the difference in sulfur requirements between my process and conventional processes may be explained by considering present theories of the vulcanization of rubber. According to such theories, rubber and sulfur react to form rubber-sulfur addition compounds such as rubber-mercaptans as the initial step of vulcanization. The rubber-mercaptan may then be assumed to react with additional sulfur to form stable intermolecular cross-linkages. During this second reaction, part of the additional sulfur is reduced to sulfide sulfur, that is, the sulfur acts as an oxidizing agent. In my new process, I believe that the organic oxidizing materials which I employ are capable of performing this second reaction, the assumed oxidation step, thus taking the place of a large part of the sulfur ordinarily employed in vulcanization. However, unlike the oxidation with sulfur presently assumed to be one step of the vulcanization process, the oxidation step with the organic oxidizing materials which I employ proceeds without the addition of zinc oxide or other combined metal activator formerly considered to be essential. In my process, no appreciable vulcanization takes place under ordinary curing conditions unless at least a small amount of sulfur, i. e., 0.25 part per 100 parts of rubber is present.

Larger quantities of sulfur, e. g., 3 parts or more per 100 parts of rubber may be employed if desired, provided the amount of oxidizing agent used is small. Overcure takes place and optimum physical properties are not attained if, in the same formulation, the quantity of sulfur is greater than 2% and the amount of oxidizing agent is greater than about 5%, i. e., the vulcanizing action of the sulfur and oxidizing agent is additive, producing an overcure if larger than the preferred amounts of both are used together.

The quantity of dithiocarbamate accelerator employed may vary from about 0.35 to 5 parts per 100 parts of rubber and is preferably about 0.5 to 2.0 parts per 100 parts of rubber.

The quantity of amine employed is preferably about 0.5 to 1.5 parts per 100 parts of rubber. Larger amounts may be used, e. g., 2 to 4 parts per 100 parts of rubber, but tend to cause reversion of the cure, if employed at higher curing temperatures.

The time and temperature required for vulcanization by my improved process is, in general, of the same order as required for conventional cures, e. g., 15 to 120 minutes at 160 to 130° C., depending on the particular formulation employed. At higher or lower curing temperatures, the time of cure is correspondingly decreased or increased.

Further examples of organic oxidizing materials which may be employed as vulcanizing agents in my process are bis(4,5-dimethylthiazyl) disulfide, bis(ethoxyphenyliminomethyl) disulfide, p-quinone-bis-phenylimine, p-quinone dioxime, diazoaminobenzene, and m-dinitrobenzene. All of these materials, when formulated as described previously, give results comparable with the specific examples shown in the tables.

Further examples of accelerators which may be employed to increase the rate and degree of cure obtained in my process are cupric diethyl dithiocarbamate and lead dimethyl dithiocarbamate, and similar metal dialkyl dithiocarbamate accelerators which are well known in the art.

Further examples of organic amines which may be used include diamylamine, dioctylamine, tributylamine, etc.

I am aware that it is known to be possible to vulcanize rubber in the presence of certain organic oxidizing materials, notably p-quinone dioxime and the like. However, as shown in the examples above, my process, in which it is essential to employ a metal dialkyl dithiocarbamate accelerator, gives far superior results.

Having thus described my invention, what I claim and desire to protect by Letters Patent is:

1. A composition vulcanizable in the absence of a combined metal activator comprising 100 parts by weight of rubber, 0.35 to 5 parts of an accelerator from the class consisting of zinc, cupric and lead dialkyl dithiocarbamates, 0.25 to 2 parts of sulfur, and 2 to 15 parts of a thiazyl disulfide.

2. A composition vulcanizable in the absence of a combined metal activator comprising 100 parts by weight of rubber, 0.35 to 5 parts of zinc dimethyl dithiocarbamate as accelerator, 0.25 to 2 parts of sulfur and 2 to 15 parts of 2,2'-benzothiazyl disulfide.

3. A composition vulcanizable in the absence of a combined metal activator comprising 100 parts by weight of rubber, 0.35 to 5 parts of zinc dimethyl dithiocarbamate as accelerator, 0.25 to 2 parts of sulfur, and 2 to 15 parts of bis(4,5-dimethylthiazyl) disulfide.

4. The process which comprises vulcanizing, in the absence of a combined metal activator, a composition of 100 parts by weight of rubber, 0.35 to 5 parts of an accelerator from the class consisting of zinc, cupric and lead dialkyl dithiocarbamates, 0.25 to 2 parts of sulfur, and 2 to 15 parts of a thiazyl disulfide.

5. The process which comprises vulcanizing, in the absence of a combined metal activator, a composition of 100 parts by weight of rubber, 0.35 to 5 parts of zinc dimethyl dithiocarbamate as accelerator, 0.25 to 2 parts of sulfur, and 2 to 15 parts of 2,2'-benzothiazyl disulfide.

6. The process which comprises vulcanizing, in the absence of a combined metal activator, a composition of 100 parts by weight of rubber, 0.35 to 5 parts of zinc dimethyl dithiocarbamate as accelerator, 0.25 to 2 parts of sulfur, and 2 to 15 parts of bis(4,5-dimethylthiazyl) disulfide.

7. A vulcanized rubber product derived, in the absence of a combined metal activator, from a composition of 100 parts by weight of rubber, 0.35 to 5 parts of an accelerator from the class consisting of zinc, cupric and lead dialkyl dithiocarbamates, 0.25 to 2 parts of sulfur, and 2 to 15 parts of a thiazyl disulfide.

8. A vulcanized rubber product derived, in the absence of a combined metal activator, from a composition of 100 parts by weight of rubber, 0.35 to 5 parts of zinc dimethyl dithiocarbamate as accelerator, 0.25 to 2 parts of sulfur, and 2 to 15 parts of 2,2'-benzothiazyl disulfide.

9. A vulcanized rubber product derived, in the absence of a combined metal activator, from a composition of 100 parts by weight of rubber, 0.35 to 5 parts of zinc dimethyl dithiocarbamate as accelerator, 0.25 to 2 parts of sulfur, and 2 to 15 parts of bis(4,5-dimethylthiazyl) disulfide.

BERNARD C. BARTON.

REFERENCES CITED

The following references are of record in the file of this patent:

UNITED STATES PATENTS

| Number | Name | Date |
| --- | --- | --- |
| 1,386,153 | Bruni | Aug. 2, 1921 |
| 2,037,749 | Anderson | Apr. 21, 1936 |
| 2,058,246 | McCortney | Oct. 20, 1936 |
| 2,421,831 | Cooper | Jan. 10, 1947 |